March 24, 1953     R. L. HUPP     2,632,874
MOTOR SPEED REGULATING SYSTEM
Filed Jan. 21, 1950
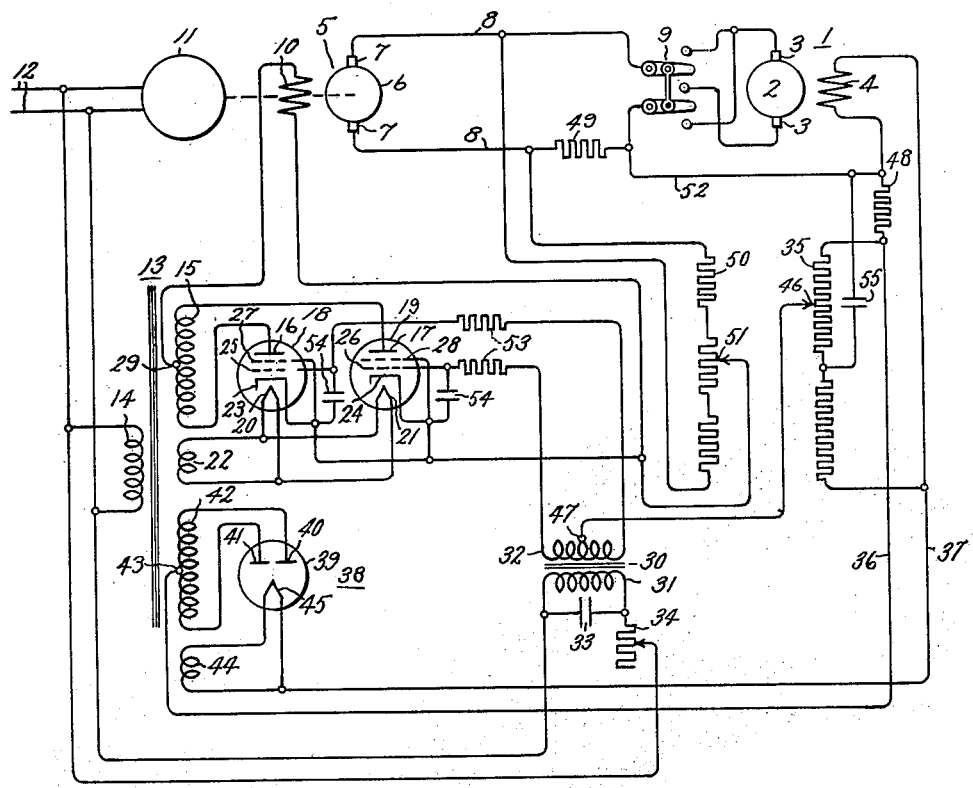
Inventor:
Raymond L. Hupp,
by Ernest C. Britton
His Attorney.

Patented Mar. 24, 1953

2,632,874

UNITED STATES PATENT OFFICE 2,632,874

MOTOR SPEED REGULATING SYSTEM

Raymond L. Hupp, Fort Wayne, Ind., assignor to General Electric Company, a corporation of New York Application January 21, 1950, Serial No. 139,939

9 Claims. (Cl. 318—142)

This invention relates to direct current motor speed regulating systems and, more particularly, to a system of the Ward-Leonard type in which means are provided for maintaining a predetermined motor speed independent of the load and line voltage.

In a variable voltage or Ward-Leonard type motor control system, a direct current motor is supplied current from a separate generator whose output voltage is controlled by field variation so as to control the speed of the motor. In the design of such a system, it is desirable not only to provide means for rapidly varying the motor speed, but also means for automatically maintaining a pre-selected speed regardless of variations in the load or the line voltage of the motor driving the generator. This objective can be more readily accomplished by supplying the generator field winding with rectified current from one or more electronic discharge tubes of the Thryatron type. The energization supplied to the generator field by these electronic discharge devices can be varied by controlling the bias on the devices in accordance with the differential between the actual speed of the motor and the desired speed.

An object of this invention is to provide an improved speed regulating system for direct current motors.

Another object of this invention is to provide an improved direct current motor speed regulation in a Ward-Leonard type system.

A further object of this invention is to provide improved speed regulation for a motor in a Ward-Leonard system wherein the motor speed can be readily adjusted and automatically maintained at the desired value independent of load and line voltage.

A still further object of this invention is to provide improved electronic speed regulation for a motor in a Ward-Leonard system.

Further objects and advantages of this invention will become apparent and the invention will be better understood from the following description referring to the accompanying drawing, and the features of novelty which characterize this invention will be pointed out with particularity in the claims annexed to and forming a part of this specification.

In accordance with this invention, there is provided a direct current motor and a direct current generator with their armatures serially connected in the conventional Ward-Leonard arrangement. The generator is provided with a separately excited field winding arranged for energization by one or more electronic discharge devices. The current supplied to the generator field winding by these devices is controlled by impressing upon the control electrodes of the discharge device, a biasing voltage differentially responsive to a predetermined direct current voltage corresponding to the desired speed and a voltage proportional to the generator armature voltage which is, in turn, proportional to the motor speed.

The drawing shows schematically the improved motor speed regulating circuit of this invention.

Referring to the drawing, there is shown a direct current motor 1 having an armature 2 of the conventional type provided with a commutator and brushes 3. The motor 1 is provided with a separately excited field winding 4 which may be energized by a rectifier as will be hereinafter described. A direct current generator 5 is provided for furnishing energy to the motor 1 having an armature 6 of the conventional type provided with a commutator and brushes 7. The motor brushes 3 and the generator brushes 7 are connected by lines 8 providing serial connection of the motor armature 2 and the generator armature 6. A reversing switch 9 is arranged in the circuit between the motor brushes 3 and the generator brushes 7 to provide for reversal of the motor 1. The generator 5 is separately excited by a field exciting winding 10 and is driven by a suitable prime mover 11, for instance, an alternating current induction motor arranged for energization by a suitable source of alternating current (not shown) through lines 12.

In order to provide excitation for the generator field winding 10, the arrangement now to be described is provided. A transformer 13 is provided having its primary winding 14 connected across the alternating current supply lines 12 and a secondary winding 15 arranged with its two ends respectively connected to the anodes 16 and 17 of electronic discharge tubes 18 and 19 which are preferably of the Thyratron type. The discharge tubes 18 and 19 are also respectively provided with heaters 20 and 21 connected to a secondary winding 22 of transformer 13, cathodes 23 and 24, control electrodes 25 and 26, and shield electrodes 27 and 28. One side of the generator field winding 10 is connected to the center tap 29 of the secondary winding 15 of the transformer 13 and the other side is connected to the cathodes 23 and 24 providing a conventional full wave rectifier circuit for providing rectified direct current to the generator field winding 10. The discharge tubes 18 and 19 are of the type in which unidirectional discharge current flows upon energization of the control electrodes 25 and 26 to a predetermined degree when the anodes 16 and 17 are positive with reference to the cathodes 23 and 24. This flow of unidirectional discharge current continues until the instantaneous potential of the anodes becomes approximately the same as that of the cathodes. In this type of tube, the value of control electrode potential which causes the tube to become conductive depends on the phase angle in the positive half cycle on the anode. It will thus be readily apparent that the excitation of the generator field winding 10 may be controlled by controlling the voltage impressed on the control electrodes 25 and 26.

In order to provide for varying the excitation of the generator field winding 10, a transformer 30 is provided having its primary 31 connected across the alternating current supply lines 12 and the two ends of its secondary 32 respectively connected to the control electrodes 25 and 26 of the discharge tubes 18 and 19. Thus, there is impressed upon the control electrodes 25 and 26 an alternating current voltage which will effect conduction of the tubes at the point where the instantaneous impressed voltage reaches the predetermined critical control electrode voltage above which conduction takes place. As pointed out above, the control electrode voltage at which the tubes will become conductive depends upon the phase angle in the positive half cycle on the anode. In order to shift the phase relationship of the alternating current voltage impressed on the electrodes 25 and 26 with respect to the alternating current voltage on the supply lines 12 and between the cathodes and anodes 23, 16 and 24, 17 respectively, and thus to vary the point at which the tubes 18 and 19 become conductive, a phase shift network comprising a capacitor 33 and a variable resistor 34 is arranged in circuit with the primary 31 of the transformer 30. As the system has been hereinbefore described, an alternating current voltage is impressed on the control electrodes 25 and 26 having a predetermined phase relationship with the alternating current voltage on the anodes 16 and 17 to effect cathode-anode conduction at a predetermined phase angle point in the positive half cycle of the voltage wave on the anodes determined by adjustment of the variable resistor 34.

It will now be readily apparent that if a direct current voltage is superposed on the alternating current voltage impressed on the control electrodes 25 and 26, the phase angle point at which the tubes become conductive will be varied depending upon the magnitude of the superposed voltage or bias. In accordance with this invention, therefore, in order to control the energization of the generator field winding 10 to maintain the speed of the motor 1 constant, a voltage which is the differential of a predetermined voltage corresponding to the desired speed and a voltage dependent upon the motor speed is superposed on the alternating current voltage impressed upon the control electrodes 25 and 26. To accomplish this, a potentiometer 35 is connected across lines 36 and 37 which supply direct current to the motor field winding 4. The motor field winding 4 is shown here as being excited by a full wave rectifier 38 comprising a full wave rectifier tube 39 having its anodes 40 and 41 respectively connected to the two ends of a secondary winding 42 of the transformer 13. The line 36 is connected to the center tap 43 of the secondary winding 42 and thus is the negative line. A secondary winding 44 of the transformer 13 energizes the heater 45 of the tube 39 and line 37 is connected thereto becoming the positive line. A movable contact 46 of the potentiometer 35 is connected to the center tap 47 of the secondary 32 of transformer 30 and thus a predetermined direct current voltage determined by the setting of the potentiometer 35 is superposed on the alternating current voltage impressed on the control electrodes 25 and 26. The potentiometer 35 is the speed selection device in this system and the voltage picked off by the movable contact 46 corresponds to the predetermined desired speed. A resistor 48 is arranged in series with the line 36 intermediate the motor field winding 4 and the potentiometer 35 to provide a negative bias so that the tubes 18 and 19 will not conduct current when potentiometer 35 is set at zero.

In order to supply a bias voltage proportional to the motor speed, a resistor 49 is arranged in series with one of the lines 8 interconnecting the generator armature and the motor armature 2 to provide compensation for the I. R. drop in the motor armature. Thus, for a given speed setting of potentiometer 35, the motor armature voltage will be increased or decreased as the I. R. drop of resistor 49 is increased or decreased. Another potentiometer 50 is arranged across the lines 8 between the resistor 49 and the generator brushes 7. The movable contact 51 of the potentiometer 50 is connected to the cathodes 23 and 24 of the tubes 18 and 19. It is well known that the voltage across a direct current motor armature, after compensation for I. R. drop, is proportional to the speed. Therefore, the voltage picked off by the contact 51 of the potentiometer 50 is proportional to the generator output voltage and, since the I. R. drop in the motor armature 2 is compensated by the resistor 49, it is therefore proportional to the motor speed. As will be hereinafter described, the movable contact 51 of the potentiometer 50 provides adjustment so that the excitation provided to the generator field winding 10 will produce a generator voltage sufficient to maintain the motor 1 at the speed selected by the potentiometer 35. In order to provide a complete circuit, a line 52 interconnects the end of the resistor 48 adjacent the motor field winding 4 and the end of the resistor 49 remote from its connection with the potentiometer 50.

Tracing the circuit now provided between the cathodes 23 and 24 and the control electrodes 25 and 26, there is found the potentiometer 50, the resistor 49, the line 52, the resistor 48, and the potentiometer 35. It will now be readily apparent that the effective voltage between the cathodes 23 and 24 and the control electrodes 25 and 26 is the differential between the predetermined voltage selected by the potentiometer 35 which corresponds to the predetermined desired speed and a voltage proportional to the voltage across the generator 5 which is dependent on the motor speed. Current limiting resistors 53 are arranged in series with the control electrodes 25 and 26 and serve to limit control electrode to cathode current flow during the positive half cycle of impressed voltage. By-pass capacitors 54 and 55 respectively connect the control electrodes 25 and 26 to the cathodes 23 and 24. An electrolytic capacitor 55 acts as a filter for the predetermined direct current voltage superposed on the transformer 30. The generator field 10 is connected so that the negative line 8 connects to resistor 49. This produces voltages of the same polarity across potentiometers 50 and 35.

In operation, after a predetermined desired speed has been selected by adjustment of the movable contact 46 of the potentiometer 35, at the instant of starting of the driving motor 11 and generator 5, there will be no voltage across the lines 8 and, therefore, no direct current voltage impressed on the cathodes 23 and 24 of the tubes 18 and 19. The effective cathode to control electrode voltage, therefore, is the entire predetermined voltage selected by the potentiometer 35 plus the instantaneous value of the alternating current voltage impressed on the control electrodes by the transformer 30. Under this condition, the tubes will fire at the beginning of the positive half cycle of voltage on the anodes 16 and 17 producing maximum current flow in the generator field winding 10. As the generated voltage across the lines 8 increases, accompanied by a proportional increase in motor speed, the voltage selected by the potentiometer 50 increases allowing the voltage impressed on the cathodes 23 and 24 to reduce the effective cathode to control electrode voltage. This decrease in the differential between the predetermined voltage and the speed responsive voltage which is impressed on the control electrodes retards the firing point of the tubes so that they are conductive during only a part of the positive half cycle of anode voltage. This produces a reduction in the excitation of the generator field winding 10 and an accompanying reduction in the rate of increase of the generator voltage across the lines 8. It will be readily apparent that a point of stability will be reached where the motor speed reaches the pre-selected speed and at this point the voltage differential on the control electrodes will be only sufficient to produce current in the generator field winding 10 to maintain the motor speed at the predetermined level. After the predetermined motor speed has been reached, a tendency for the motor to decrease speed, for instance, due to an increase in load, is accompanied by a decrease in the voltage across the lines 8 and an increase in the voltage differential on the control electrodes 25 and 26. This produces an increase in the current in the generator field winding 10 to restore the speed of the motor 1 to its predetermined value. Conversely, an increase in the speed of the motor 1, for instance, as a result of an increase in the line voltage of the driving motor 11, is accompanied by an increase in the voltage on the lines 8 and a reduction in the voltage differential on the control electrodes 25 and 26. This produces a reduction in the current flow in the generator field 10 and an accompanying reduction in the generator voltage to reduce the motor speed to the desired level.

It will be readily apparent that the speed regulation system described above is superior to a system wherein the speed control is applied directly to the motor since the current requirements of the generator field winding 10 are much less than the armature current required for the motor 1. Furthermore, the speed regulating potentiometer 35 need only be of a minimum wattage rating, since no appreciable current is supplied thereby. As it is pointed out above, this circuit permits ready adjustment of the motor speed with rapid response and automatic maintenance of the desired speed independent of load and line voltage.

While I have illustrated and described a particular embodiment of this invention, modifications thereof will occur to those skilled in the art. I desire it to be understood, therefore, that this invention is not to be limited to the particular arrangement disclosed, and I intend in the appended claims to cover all modifications which do not depart from the spirit and scope of my invention.

What I claim as new and desire to secure by Letters Patent of the United States is:

1. In a direct current motor speed regulation system, a direct current motor having an armature, a direct current generator for supplying energy to said motor having an armature serially connected with said motor armature and having a separately excited field winding, an alternating current source, an electronic discharge device having an anode, a cathode and a control electrode, said device being of the type which becomes conductive when a predetermined voltage is impressed on said control electrode, said anode and said cathode of said device being connected in circuit with said alternating current source to said generator field winding for supplying rectified current thereto, and means for impressing a voltage on said control electrode differentially responsive to a predetermined voltage corresponding to a predetermined desired speed and a voltage dependent on the motor speed whereby the energization of said generator field is automatically varied to maintain said predetermined speed.

2. In a direct current motor speed regulation system, a direct current motor having an armature, a direct current generator for supplying energy to said motor having an armature serially connected with said motor armature and having a separately excited field winding, an alternating current source, an electronic discharge device having an anode, a cathode and a control electrode, said device being of the type which becomes conductive when a predetermined voltage is impressed on said control electrode, said anode and said cathode of said device being connected in circuit with said alternating current source to said generator field winding for supplying rectified current thereto, and means for impressing a voltage on said control electrode differentially responsive to a predetermined voltage corresponding to a predetermined desired speed and a voltage proportional to the voltage across said motor armature whereby the energization of said generator field winding is automatically varied to maintain said predetermined speed.

3. In a direct current motor speed regulation system, a direct current motor having an armature, a direct current generator for supplying energy to said motor having an armature serially connected with said motor armature and having a separately excited field winding, an alternating current source, an electronic discharge device having an anode, a cathode and a control electrode, said device being of the type which becomes conductive when a predetermined voltage is impressed on said control electrode, said anode and said cathode of said device being connected in circuit with said alternating current source to said generator field winding for supplying rectified current thereto, means for impressing an alternating current voltage on said control electrode having a predetermined phase relationship with the voltage across said anode and cathode for effecting cathode-anode conduction, and means differentially responsive to a predetermined direct current voltage corresponding to a predetermined desired speed and a direct current voltage dependent on the speed of said motor for biasing said control electrode to vary the point at which said discharge device becomes conductive whereby the energization of said generator field winding is automatically varied to maintain said predetermined speed.

4. In a direct current motor speed regulation system, a direct current motor having an armature, a direct current generator for supplying energy to said motor having an armature serially connected with said motor armature and having a separately excited field winding, an alternating current source, an electronic discharge device having an anode, a cathode and a control electrode, said device being of the type which becomes conductive when a predetermined voltage is impressed on said control electrode, said anode and said cathode of said device being connected in circuit with said alternating current source to said generator field winding for supplying rectified current thereto, means for impressing an alternating current voltage on said control electrode having a predetermined phase relationship with the voltage across said anode and cathode for effecting cathode-anode conduction, and means differentially responsive to a predetermined direct current voltage corresponding to a predetermined desired speed and a direct current voltage proportional to the voltage across said motor armature for biasing said control electrode to vary the point at which said discharge device becomes conductive whereby the energization of said generator field winding is automatically varied to maintain said predetermined speed.

5. In a direct current motor speed regulation system, a direct current motor having an armature, a direct current generator for supplying energy to said motor having an armature serially connected with said motor armature and having a separately excited field winding, an alternating current source, an electronic discharge device having an anode, a cathode and a control electrode, said device being of the type which becomes conductive when a predetermined voltage is impressed on said control electrode, said anode and said cathode of said device being connected in circuit with said alternating current source to said generator field winding for supplying rectified current thereto, means for impressing an alternating current voltage on said control electrode having a predetermined phase relationship with the voltage across said anode and cathode for effecting a cathode-anode conduction, means for shifting said phase relationship, and means differentially responsive to a predetermined direct current voltage corresponding to a predetermined desired speed and a direct current voltage proportional to the voltage across said motor armature for biasing said control electrode to vary the point at which said discharge device becomes conductive whereby the energization of said generator field winding is automatically varied to maintain said predetermined speed.

6. In a direct current motor speed regulation system, a direct current motor having an armature, a direct current generator for supplying energy to said motor having an armature serially connected with said motor armature and having a separately excited field winding, an alternating current source, an electronic discharge device having an anode, a cathode and a control electrode, said device being of the type which becomes conductive when a predetermined voltage is impressed on said control electrode, said anode and said cathode of said device being connected in circuit with said alternating current source to said generator field winding for supplying rectified current thereto, means for impressing an alternating current voltage on said control electrode for a predetermined phase relationship with the voltage across said anode and cathode for effecting a cathode-anode conduction, speed regulating means for superposing a predetermined direct current voltage corresponding to a predetermined desired speed on said alternating current voltage impressed on said control electrode, and means for impressing a direct current voltage dependent on the speed of said motor on said cathode so that said control electrode is biased by a voltage which is the differential between said predetermined voltage and said speed dependent voltage whereby the point at which said discharge device becomes conductive is varied so that the energization of the said generator field winding is automatically varied to maintain said predetermined speed.

7. In a direct current motor speed regulation system, a direct current motor having an armature, a direct current generator for supplying energy to said motor having an armature serially connected with said motor armature and having a separately excited field winding, an alternating current source, an electronic discharge device having an anode, a cathode and a control electrode, said anode and said cathode of said device being connected in circuit with said alternating current source to said generator field winding for supplying rectified current thereto, means for impressing an alternating current voltage on said control electrode having predetermined phase relationship with the voltage across said anode and cathode for effecting cathode-anode conduction, speed regulating means for superposing a predetermined direct current voltage corresponding to a predetermined desired speed on the alternating current voltage impressed on said control electrode, and means for impressing a direct current voltage proportional to the voltage across said motor armature on said cathode so that said control electrode is biased by a voltage which is the differential of the said predetermined voltage and said voltage proportional to said motor armature voltage whereby the point at which said device becomes conductive is varied so that the energization of said generator field winding is automatically varied to maintain said predetermined speed.

8. In a direct current speed regulation system, a direct current motor having an armature and a separately excited field winding, a source of direct current for energizing said motor field winding, a direct current generator for supplying energy to said motor having an armature serially connected with said motor armature and having separately excited field winding, a source of alternating current, an electronic discharge device having an anode, a cathode, and a control electrode, said discharge device being of the type which becomes conductive when a predetermined voltage is impressed on said control electrode, said anode and said cathode being connected in a circuit with said alternating current source to said generator field winding for supplying rectified current thereto, means for impressing an alternating current voltage on said control electrode having predetermined phase relationship with the voltage across said anode and cathode for effecting cathode-anode conduction, a speed regulating potentiometer connected across said motor field winding for selecting a predetermined direct current voltage corresponding to a predetermined desired speed, said potentiometer being arranged in circuit with said impressing means whereby said predetermined voltage is superposed on the alternating current voltage impressed on said control electrode, and a potentiometer connected across said generator armature for selecting a voltage proportional to said motor armature voltage, said potentiometer being arranged in circuit with said cathode for impressing said voltage proportional to said generator armature voltage on said cathode so that said control electrode is biased by a voltage which is the differential of said predetermined voltage and said voltage proportional to said motor armature voltage whereby the point at which said device becomes conductive is varied so that the energization of said generator field winding is automatically varied to maintain said predetermined speed.

9. In a direct current motor speed regulation system, a direct current motor having an armature, a direct current generator for supplying energy to said motor having an armature serially connected with said motor armature and having a separately excited field winding, an alternating current source, an electronic discharge device having an anode, a cathode and a control electrode, said device being of the type which becomes conductive when a predetermined voltage is impressed on said control electrode, said anode and said cathode of said device being connected in circuit with said alternating current source to said generator field winding for supplying rectified current thereto, means for impressing an alternating current voltage on said control electrode having a predetermined phase relationship with the alternating current voltage across said anode and cathode for effecting a cathode-anode conduction, means for compensating for I. R. drop in said motor armature, speed regulating means for superposing a predetermined direct current voltage corresponding to a predetermined desired speed on said alternating current voltage impressed on said control electrode, and means for impressing a direct current voltage proportional to the voltage across said generator armature remote from said compensating means on said cathode so that said control electrode is biased by a voltage which is the differential of said predetermined voltage and said voltage proportional to said generator armature voltage whereby the point at which said discharge device becomes conductive is varied so that the energization of said generator field winding is automatically varied to maintain said predetermined speed.

RAYMOND L. HUPP.

REFERENCES CITED

The following references are of record in the file of this patent:

UNITED STATES PATENTS

| Number | Name | Date |
| --- | --- | --- |
| 2,084,206 | La Roque | June 15, 1937 |
| 2,119,715 | Miner | June 7, 1938 |
| 2,121,588 | Eames | June 21, 1938 |
| 2,237,015 | Stratton | Apr. 1, 1941 |
| 2,389,367 | King | Nov. 20, 1945 |
| 2,508,179 | Lund et al. | May 16, 1950 |